United States Patent
Igarashi et al.

(10) Patent No.: US 9,512,337 B2
(45) Date of Patent: Dec. 6, 2016

(54) PAINT FILM-PROTECTING SHEET AND METHOD OF MANUFACTURE

(75) Inventors: Takeshi Igarashi, Ibaraki (JP); Toshitaka Suzuki, Ibaraki (JP); Yuki Saitou, Ibaraki (JP); Ikko Hanaki, Ibaraki (JP); Masahiro Kondo, Amagasaki (JP); Yoshikuni Hirano, Amagasaki (JP)

(73) Assignees: NITTO DENKO CORPORATION, Ibaraki-Shi (JP); KANSAI PAINT CO., LTD., Amagasaki (JP)

( * ) Notice: Subject to any disclaimer, the term of this patent is extended or adjusted under 35 U.S.C. 154(b) by 945 days.

(21) Appl. No.: 12/635,889

(22) Filed: Dec. 11, 2009

(65) Prior Publication Data

US 2010/0151237 A1 Jun. 17, 2010

(30) Foreign Application Priority Data

Dec. 12, 2008 (JP) ................. 2008-316943

(51) Int. Cl.
*B32B 27/32* (2006.01)
*B32B 5/12* (2006.01)
*C09J 7/02* (2006.01)

(52) U.S. Cl.
CPC ............... *C09J 7/0275* (2013.01); *C09J 7/021* (2013.01); *C09J 2203/31* (2013.01); *C09J 2423/00* (2013.01); *C09J 2423/006* (2013.01); *Y10T 428/28* (2015.01)

(58) Field of Classification Search
CPC .... C09J 7/0296; C09J 7/0267; C09J 123/22; C09J 2203/31; C09J 2203/306; C09J 2423/006; B32B 27/322; B32B 27/32; B32B 7/12; Y10T 428/28; Y10T 428/2878; Y10T 428/2495

See application file for complete search history.

(56) References Cited

U.S. PATENT DOCUMENTS 4,769,283 A * 9/1988 Sipinen et al. ................ 428/343
5,612,135 A * 3/1997 Matsui et al. ................. 428/343
(Continued)

FOREIGN PATENT DOCUMENTS

CA 2 070 232 C 1/2003
CN 101255320 A 9/2008
(Continued)

OTHER PUBLICATIONS

European Patent Office, Extended European Search Report in European Patent Application No. 09178905.7 (Mar. 15, 2012).
(Continued)

*Primary Examiner* — Samir Shah
(74) *Attorney, Agent, or Firm* — Leydig, Voit & Mayer, Ltd.

(57) ABSTRACT

A paint film-protecting sheet, which is unwound from a roll for use, and in which occurrence of adhesive transfer at edges thereof is effectively prevented, and a method of manufacturing same are provided. The paint film-protecting sheet is in the form of a roll obtained by winding in a lengthwise direction a pressure-sensitive adhesive sheet formed of a substrate in continuous sheet form and a pressure-sensitive adhesive layer disposed on the substrate. The substrate comprises a resin component made primarily of polyethylene resin or polypropylene resin. The paint film-protecting sheet, after being unwound from the roll, has a percent shrinkage, in the lengthwise direction, of not greater than 1.2% when heated at 80° C. for 1 hour.

17 Claims, 1 Drawing Sheet

(56) References Cited

U.S. PATENT DOCUMENTS

| | | | |
|---|---|---|---|
| 5,747,132 A | 5/1998 | Matsui et al. | |
| 6,689,857 B1 * | 2/2004 | Larter et al. | 526/348.5 |
| 7,408,604 B2 | 8/2008 | Takada et al. | |
| 2002/0009587 A1 * | 1/2002 | Inoue | C09J 7/0214 |
| | | | 428/355 RA |
| 2002/0091197 A1 * | 7/2002 | Nakamura et al. | 525/123 |
| 2002/0114939 A1 * | 8/2002 | Schumann et al. | 428/317.5 |
| 2003/0190463 A1 * | 10/2003 | Inoue et al. | 428/337 |
| 2004/0033735 A1 | 2/2004 | Takada et al. | |
| 2004/0224150 A1 * | 11/2004 | Hiramatsu | B41F 35/00 |
| | | | 428/343 |
| 2005/0042444 A1 | 2/2005 | Bohm et al. | |
| 2005/0259202 A1 | 11/2005 | Takada et al. | |
| 2008/0202663 A1 | 8/2008 | Behrens et al. | |
| 2010/0151233 A1 * | 6/2010 | Suzuki et al. | 428/337 |

FOREIGN PATENT DOCUMENTS

| | | |
|---|---|---|
| EP | 1964902 A1 | 9/2008 |
| JP | 06-073352 A | 3/1994 |
| JP | H10-323929 A | 12/1998 |
| JP | 2001-072940 A | 3/2001 |
| JP | 2002-146309 A | 5/2002 |
| JP | 2002-178317 A | 6/2002 |
| JP | 2003-285006 A | 10/2003 |
| JP | 2004-059860 A | 2/2004 |
| JP | 2005-213280 A | 8/2005 |
| JP | 2006-299162 A | 11/2006 |
| JP | 2007-136903 A | 6/2007 |
| JP | 2007-138059 A | 6/2007 |
| JP | 2007-238746 A | 9/2007 |
| WO | WO 00/05305 A1 | 2/2000 |

OTHER PUBLICATIONS

Chinese Patent Office, First Notice of the Opinion on Examination in Chinese Patent Application No. 200910253273.6 (Feb. 22, 2013).
Japan Patent Office, Notice of Reason for Rejection in Japanese Patent Application No. 2008-316943 (Mar. 28, 2013).
Japan Patent Office, Notice of Allowance in Japanese Patent Application No. 2008-316943 (Sep. 19, 2013).
State Intellectual Property Office of the People's Republic of China, Second Notice of the Opinion on Examination in Chinese Patent Application No. 200910253273.6 (Oct. 12, 2013).

* cited by examiner

PAINT FILM-PROTECTING SHEET AND METHOD OF MANUFACTURE

BACKGROUND OF THE INVENTION

1. Field of the Invention

The present invention relates to a sheet for protecting a paint film from damage such as scratches and dirt.

This application claims priority from Japanese Patent Application No. 2008-316943, filed on Dec. 12, 2008, the entire contents of which are incorporated herein by reference.

2. Description of the Related Art

Technology is known for bonding a protective sheet to the paint film of articles having a paint film (e.g., painted automobiles and automotive components, sheet metal such as sheet steel and shaped articles thereof) in order to prevent damage to the paint film surface when, for example, transporting, storing, curing or constructing (sometimes collectively referred to below as "transporting, etc.") the article. Paint film-protecting sheets used for such a purpose generally have a pressure-sensitive adhesive (PSA) layer on one side of a sheet-like substrate made of resin, and are constructed in such a way as to enable the aim of protection to be achieved by bonding of the sheet to the adherend surface (the paint film to be protected) via the PSA layer. This type of paint film-protecting sheet has been described in the prior-art, including Japanese Patent Application Publication Nos. H6-73352 and 2007-238746. In addition, Japanese Patent Application Publication No. 2005-213280 describes an anchoring agent composition for a PSA.

In recent years, the demand for greater decorativeness in the appearance of paint films has increased even further in efforts to increase the value of goods (automobiles, etc.). For example, when a paint film-protecting sheet whose protective role has come to an end is stripped (removed) from the surface of a paint film, there is a desire for a way to more reliably prevent deposits (typically some of the PSA making up the PSA layer) from the sheet from remaining behind on the surface of the paint film (a phenomenon known as "adhesive transfer").

Conventional techniques for preventing adhesive transfer include a method wherein an ingredient which lowers adhesiveness is included in the PSA (Japanese Patent Application No. H6-73352), and a method for preventing deterioration of the PSA layer and suppressing adhesive transfer by using a substrate which includes a weathering stabilizer and has a specific ultraviolet light transmittance (Japanese Patent Application No. 2007-238746). Another conventional technique for preventing adhesive transfer is a method in which an anchoring agent is disposed between the substrate and the PSA (Japanese Patent Application Laid-open No. 2005-213280).

SUMMARY OF THE INVENTION

However, these conventional methods do not have a sufficient adhesive transfer preventing effect at the edges (borders) of the paint film-protecting sheet. In particular, when a paint film-protecting sheet in roll form obtained by winding in the lengthwise direction a continuous length of PSA sheet is used in a manner that involves unwinding the protective sheet from the roll and affixing the sheet to an adherend such as an automobile, adhesive transfer has tended to arise at the edges of the protective sheet in the lengthwise direction (i.e., the machine direction (MD)).

It is therefore an object of the present invention to provide a paint film-protecting sheet in roll form obtained by winding in the lengthwise direction a continuous length of PSA sheet, which paint film-protecting sheet can very effectively prevent adhesive transfer at the edges thereof (particular at the edges in the lengthwise direction). Another object of the invention is to provide a method of manufacturing such a roll-type paint film-protecting sheet.

In working to resolve the above-described problem of adhesive transfer at the edges of a paint film-protecting sheet in roll form (sometimes referred to below as simply the "protective sheet"), the inventors have focused in particular on the strain that exists within the substrate of the roll-type protective sheet. In addition, the inventors have discovered a method for properly evaluating the degree of such strain by taking into account the manner in which the paint film-protecting sheet is used, and have found moreover that the problem of adhesive transfer at the edges of the sheet can be resolved with a roll-type protective sheet which yields given results in such a method of evaluation.

The present invention provides a paint film-protecting sheet in roll form comprising a PSA sheet wound in a lengthwise direction. The PSA sheet is composed of a substrate in continuous sheet form and a pressure-sensitive adhesive layer disposed on the substrate. The substrate comprises polyethylene (PE) resin or polypropylene (PP) resin as a primary resin component. The paint film-protecting sheet, after being unwound from the roll, has a percent shrinkage, in the lengthwise direction, of 1.2% or less than 1.2% when heated at 80° C. for 1 hour.

The resin substrate in continuous sheet form is generally obtained by film formation as a sheet by a T-die process or an inflation process. Because such formation is accompanied by orientation in the film-forming machine direction (MD), or lengthwise direction, strain tends to build up in the substrate (resin sheet) due to factors such as the resin orientation. Also, when the substrate in continuous sheet form is subjected to adhesive treatment, then taken up into a roll, the adhesive treatment (e.g., treatment in which a PSA composition is applied to the substrate and dried so as to form a PSA layer on the substrate) is generally carried out while having the substrate travel in the lengthwise direction. To appropriately carry out such travel and take-up, it is necessary to apply some degree of tension to the substrate. Even with such an applied tension, strain may build up in the substrate. When strain has accumulated in the substrate of a paint film-protecting sheet that has been wound into a roll, the substrate will shrink due to removal of the strain when the protective sheet is unwound from the roll. For example, when a protective sheet that has been unwound from a roll is affixed to an adherend then exposed to high-temperature conditions, the strain is dispelled and the substrate shrinks while at the same time the PSA in contact with the adherend tries to remain stationary at the initial adherend bonding position. This can become a major cause of adhesive transfer at the edges (borders) of the protective sheet.

The protective sheet in roll form of the present invention is characterized in that the percent shrinkage in the lengthwise direction (MD heat shrinkage ratio) is not more than a specific value. Because the paint film-protecting sheet in roll form wherein the substrate strain has been suppressed so as to satisfy this MD heat shrinkage ratio undergoes little substrate shrinkage even when subjected to an elevated temperature after being affixed to an adherend (e.g., a painted automotive or other vehicle body), a protective sheet having an excellent ability to prevent adhesive transfer at the edges thereof can be obtained.

The PSA layer is preferably composed of a non-crosslinking PSA (e.g., a polyisobutylene PSA). Here, "PSA layer composed of a non-crosslinking PSA" refers to a PSA layer which, at the time of PSA layer formation, is not deliberately treated (i.e., subjected to crosslinking treatment, such as by including a crosslinking agent) so as to form chemical bonds between the polymers making up the PSA. Because strain substantially does not build up in such PSA layers (even when strain temporarily arises, it Can be easily dispelled), when a paint film-protecting sheet has been unwound from the form of a roll, the shrinkage that accompanies strain release does not arise in the PSA layer. For this reason, in conventional paint film-protecting sheets in roll form obtained using a non-crosslinking PSA, due to differences in the shrinkage behavior of the substrate and the PSA layer, there has been a tendency for adhesive transfer to readily arise at the edges. Accordingly, the application of the present invention to this type of protective sheet is particularly effective. Also, non-crosslinking PSAs have certain qualities that are highly suitable as PSAs for paint film-protecting sheets; for example, when the protective sheet is affixed to a paint film, such PSAs do not readily leave marks on the paint film.

The substrate of the protective sheet disclosed herein typically includes an ethylene component as the monomer making up the polyethylene and/or as a comonomer in another polymer. A substrate in which the ethylene component content is up to 50% by mass of the total content is preferred. That is, it is preferable for the total amount of ethylene component present in the substrate as a whole to be up to 50% by mass of the overall substrate. A substrate having such a composition is suitable for constructing a roll-type protective sheet having a low MD heat shrinkage ratio.

In a preferred embodiment, a surface of the substrate on a PSA layer side thereof is composed of a material containing at least 20% by mass of an ethylene component. Such a substrate is ideal for anchoring a PSA (e.g., a polyisobutylene PSA). Therefore, with a protective sheet obtained using such a substrate, in addition to the edges of the sheet, adhesive transfer at protected areas (areas where the sheet covers and protects a paint film) can also be effectively prevented.

According to another embodiment, the invention also provides a method of manufacturing a paint film-protecting sheet in roll form obtained by winding in a lengthwise direction a PSA sheet shaped in continuous sheet form. The method includes the step of applying a PSA composition to a substrate which is in continuous sheet form and comprises, as a primary resin component, PE resin or PP resin. The manufacturing method also includes the step of drying or curing the applied PSA composition so as to form a PSA sheet composed of the substrate and a PSA layer disposed on the substrate. The method additionally includes the step of winding the PSA sheet in a lengthwise direction into a roll. This winding step is carried out in such a way that the paint film-protecting sheet, after being unwound from the roll, has a percent shrinkage, in the lengthwise direction, of 1.2% or less than 1.2% when heated at 80° C. for 1 hour. It is preferable to carry out the winding up step in such a way that the winding tension per meter of PSA sheet width is not greater than 100 N. Using this manufacturing method, a paint film-protecting sheet in roll form having an excellent ability to prevent adhesive transfer as the edges can be efficiently prepared. This method may be suitably employed to produce any paint film-protecting sheet disclosed herein.

DETAILED DESCRIPTION OF THE INVENTION

Preferred embodiments of the invention are described below. Matters which are not specifically mentioned in the specification but which are necessary to working the invention will be understood as matters of design by persons with ordinary skill in the art based on prior art in the field. The present invention can be worked based on details disclosed in the specification and common general technical knowledge in the field.

Figure 1:
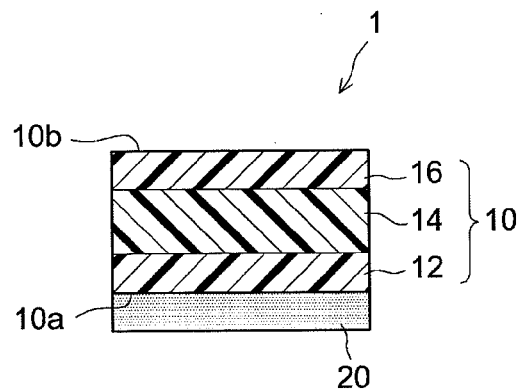
FIG. 1 is a schematic cross-sectional view of an embodiment of the paint film-protecting sheet according to the present invention.

The paint film-protecting sheet according to the present invention (e.g., a automotive paint film-protecting sheet used to protect automobiles and automotive components) is in the form of a roll obtained by winding in the lengthwise direction a PSA sheet composed of a PSA layer on a substrate in continuous sheet form. For example, as shown schematically in FIG. 1, a paint film-protecting sheet 1 is composed of a substrate 10 on one side 10a (the PSA layer side surface) of which is disposed a PSA layer 20. A second side (back side) 10b of the substrate 10 functions as a release face. In the above roll form, the PSA layer 20 comes into direct contact with the back side 10b of the substrate 10, thereby protecting the surface of the PSA layer 20. Use of the paint film-protecting sheet 1 is carried out by unwinding it from the roll form so as to expose the PSA layer 20, and affixing the PSA layer 20 to an adherend. The substrate 10 may have a structure composed of one layer, or composed of a plurality of layers which include two or more layers of differing composition. FIG. 1 shows an example that uses a substrate 10 composed of three layers: an inner layer 12 making up the surface 10a on the PSA layer side, an outer layer 16 making up the back side (release face) 10b, and an middle layer 14 disposed therebetween.

The above roll-type protective sheet is characterized by having a MD heat shrinkage ratio of up to about 1.2% (typically, from about 0.1 to about 1.2%, such as from 0.1 to 1.0%). In a paint film-protecting sheet having a machine direction (MD) heat shrinkage ratio (also referred to below as simply the "heat shrinkage ratio") greater than about 1.2%, if the protective sheet is exposed to an elevated temperature after being affixed to an adherend, adhesive transfer readily occurs at the edges (especially the edges in the machine direction). Although the heat shrinkage ratio is not subject to any particular lower limit, taking into account such considerations as the balance between productivity (e.g., line speed) and the quality and other properties (e.g., PSA layer anchoring ability) of the protective sheet, it is generally preferable for the heat shrinkage ratio to be at least 0.5%. In one preferred embodiment of the roll-type protective sheet disclosed herein, the heat shrinkage ratio is from 0.5 to 1.1%, and more preferably from 0.5 to 0.9%.

The MD heat shrinkage ratio may be determined as follows herein. The paint film-protecting sheet shortly after being unwound from a roll (preferably within 5 minutes of being unwound) is cut to a specified length along the machine direction (initial MD length). The resulting cut specimen is held at 80° C. for 1 hour, following which the MD length (MD length after heating) for that sample is measured. The MD heat shrinkage ratio can be calculated from the following formula:

(initial MD length−MD length after heating)/(initial MD length)×100(%).

The substrate used in the paint film-protecting sheet disclosed herein comprises PE resin or PP resin as a primary resin component. That is, of the resin components contained in the overall substrate, at least 50% by mass is a PE resin or a PP resin. To readily obtain a protective sheet which satisfies the desired heat shrinkage ratio, preferred use may be made of a substrate wherein at least 50% by mass, and more preferably at least 60% by mass, of the resin component is composed of PP resin.

The polypropylene resin may be composed primarily of various polymers containing propylene as an ingredient (propylene-based polymers). It may be a polypropylene resin composed substantially of one, two or more types of propylene polymer. As used herein, the concept of a propylene polymer encompasses, for example, polypropylenes such as the following:

propylene homopolymers (homopolypropylenes), such as isotactic polypropylene;

random copolymers (random polypropylenes) of propylene with another α-olefin (typically, one, two or more selected from among ethylene and α-olefins having from 4 to 10 carbons); preferably, random polypropylenes in which propylene is the primary monomer (i.e., an ingredient that accounts for at least 50% by mass of the overall monomer); for example, a random polypropylene obtained by the random copolymerization of from 96 to 99.9 mol % propylene and from 0.1 to 4 mol % of another α-olefin (preferably ethylene and/or butene); and, block copolymers (block polypropylenes) which include a copolymer (preferably one in which propylene is the primary monomer) obtained by block-copolymerizing propylene with another α-olefin (typically one, two or more selected from among ethylene and α-olefins having 4 to 10 carbons), and typically include also as a byproduct a rubber component composed of propylene and at least one other α-olefin, with illustrative examples including block polypropylenes containing a polymer obtained by copolymerizing from 90 to 99.9 mol % of propylene with from 0.1 to 10 mol % of another α-olefin (preferably ethylene and/or butene), and containing also as a byproduct a rubber component composed of propylene and at least one other α-olefin.

The above polypropylene resin may be one that is substantially composed of one, two or more such propylene polymers, or may be a thermoplastic olefin resin (TPO) or thermoplastic elastomer (TPE) of either a reactor blend-type obtained by copolymerizing a large amount of rubber ingredients in this propylene polymer or of a dry blend-type obtained by mechanically dispersing the rubber ingredient. Alternatively, it may be a polypropylene resin containing a copolymer of a monomer having both a polymerizable functional group and also another functional group (functional group-containing monomer) with propylene, or may be a polypropylene resin obtained by copolymerizing such a functional group-containing monomer with a propylene-based polymer.

The above polyethylene resin may be one that is composed primarily of various ethylene-containing polymers (ethylene-based polymers). The polyethylene resin may be composed substantially of one, two or more ethylene-based polymers. The ethylene-based polymer may be a homopolymer of ethylene or may be a polymer obtained by copolymerizing ethylene as the primary monomer with another α-olefin (e.g., an α-olefin having 3 to 10 carbons). Preferred examples of such α-olefins include propylene, 1-butene, 1-hexene, 4-methyl-1-pentene and 1-octene. Alternatively, the polyethylene resin may be one which contains a copolymer of a monomer having both a polymerizable functional group and also another functional group (functional group-containing monomer) with ethylene, or a polyethylene resin obtained by copolymerizing such a functional group-containing monomer with an ethylene-based polymer. Illustrative examples of copolymers of ethylene and functional group-containing monomers include ethylene-vinyl acetate copolymers (EVA), ethylene-acrylic acid copolymers (EAA), ethylene-methacrylic acid copolymers (EMAA), ethylene-methyl acrylate copolymers (EMA), ethylene-ethyl acrylate copolymers (EEA), ethylene-methyl methacrylate copolymers (EMMA) and ethylene-(meth)acrylic acid (i.e., acrylic acid and/or methacrylic acid) copolymers that have been crosslinked with metallic ions.

No particular limitation is imposed on the density of the polyethylene resins. For example, the density may be from about 0.9 to about 0.94 g/cm$^3$. Examples of preferred polyethylene resins include low-density polyethylene (LDPE) and linear low-density polyethylene (LLDPE).

The above substrate may be a substrate containing, as secondary ingredients, resin ingredients other than polyethylene resins and polypropylene resins. Examples of such resin ingredients include polyolefin resins composed primarily of a polymer of an α-olefin having 4 or more carbons (i.e., an olefin-based polymer in which the primary monomer is an α-olefin of this type).

Preferred substrates in the present invention are exemplified by mono- or multilayer substrates wherein the resin component is substantially composed of a polyethylene resin and/or a polypropylene resin. In the case of multilayer substrates, the respective layers making up the substrate may be any of the following: a layer in which the resin component is composed solely of a polyethylene resin (PE layer), a layer composed solely of a polypropylene resin (PP layer), or a layer composed of a resin obtained by blending a polyethylene resin with a polypropylene resin in any ratio (PE-PP layer). For example, preferred use may be made of a multilayer substrate having a plurality (preferably from two to four) of PE-PP layers containing a polyethylene resin and a polypropylene resin in differing blend ratios.

The resin material making up this resin component is selected while taking into account the manufacturing (film-forming) method and manufacturing conditions for this substrate so as to have a suitable melt mass flow rate (MFR). If necessary, two or more resin materials may be blended together and used. Although not subject to any particular limitation, use may be made of a resin material having a MFR of from about 0.5 to about 80 g/10 min. As used herein, "MFR" refers to the value obtained by measurement in accordance with JIS K7210, Method A, at a temperature of 230° C. and under a load of 21.18 N. To reduce the heat shrinkage ratio, preferred use may be made of a resin material having a MFR of from about 0.5 to about 10 g/10 min. The resin material may be a polyethylene resin or a polypropylene resin having a MFR in the above range. Alternatively, the resin material may be one obtained by blending a polyethylene resin and a polypropylene resin in such a way that the MFR falls within the above range.

It is preferable for the substrate of the protective sheet disclosed herein to be one wherein the amount of ethylene component (EC1) at the surface on the PSA layer side is at least 15% by mass. A substrate in which EC1 is at least 20% by mass is more preferred. As used herein, "ethylene component" includes both ethylene making up a polyethylene resin and ethylene serving as a comonomer in another resin (e.g., ethylene in random polypropylene). In a substrate having a single-layer structure, it is preferable to form the entire substrate of a material wherein EC1 satisfies the above-indicated value. In the case of a substrate having a multilayer structure, it is desirable to use, at least as the material which forms the layer situated furthest on the PSA layer side (inner layer), a material wherein EC1 satisfies the above-indicated value. Generally, to achieve a good balance with the amount of ethylene component in the overall substrate (EC2), it is preferable to set EC1 to up to 50% by mass.

A substrate wherein EC1 satisfies the above value has an excellent ability to anchor a PSA (especially a rubber-based PSA, such as a polyisobutylene PSA). This is advantageous from the standpoint of preventing adhesive transfer in areas protected by the sheet. For example, even in cases where a primer for enhancing the anchoring ability at the surface of the substrate on the PSA layer side thereof is not used, a sufficient adhesive transfer preventing ability can be achieved in protected areas. Therefore, this substrate can be advantageously used in protective sheets, both in embodiments where a PSA layer has been provided on the substrate without a primer therebetween, and in embodiments where a PSA layer has been provided on the substrate with a primer therebetween. Embodiments in which the PSA layer has been provided without an intervening primer are preferred from the standpoint of material costs and productivity.

The substrate of the protective sheet disclosed herein preferably has an amount of ethylene component for the overall substrate (EC2) of up to 50% by mass (typically, from 15 to 50% by mass; e.g., from 20 to 50% by mass). EC2 may even be 40% by mass or less (e.g., from 20 to 40% by mass). In a substrate having a single-layer construction, because EC1 and EC2 are identical, it is preferable to form the overall substrate using a material wherein the amount of ethylene component satisfies the preferred EC1 and EC2 mentioned above. In the case of a substrate having a multilayer structure, it is desirable to set the volumes (thickness ratios) and compositions of the respective layers in such a way that the values obtained by dividing the total mass of the ethylene component included in the respective layers by the mass of the overall substrate satisfy the above-described EC2.

If either or both of EC1 and EC2 are larger than the above value, the degree of strain that builds up in the substrate during, for example, formation of the substrate and manufacture of the protective sheet tends to become large. As a result, it may sometimes be difficult to obtain a roll-type protective sheet which satisfies the preferred MD heat shrinkage ratio disclosed here.

Where necessary, suitable ingredients (additives) whose inclusion in such a substrate is acceptable may be incorporated into the substrate of the protective sheet disclosed herein. Examples of such additives include weathering stabilizers such as pigments (typically inorganic pigments), fillers, light stabilizers (radical scavengers), ultraviolet absorbers and antioxidants. Examples of other additives include slip agents and antiblocking agents. Each of these additives may be used singly as one type alone, or may be used as a combination of two or more types. The loadings of such additives in the substrate as a whole may be set so as to be about the same as the loadings typical for the field of resin sheets employed as, for example, the substrates of paint film-protecting sheets (e.g., automotive paint film-protecting sheets). In the case of a multilayer substrate, whether or not these additives are included, and the loadings thereof, may be the same or different for each layer.

Examples of materials that may be advantageously used as the pigment or filler include inorganic powders such as titanium oxide (typically, rutile-type), zinc oxide and calcium carbonate. In applications which require long-term weather resistance outdoors (e.g., an outer paint film-protecting sheet on an automotive body), the use of titanium oxide is preferred. For example, preferred use may be made of a highly weather-resistant type of titanium oxide obtained by coating the surface of titanium oxide particles with $SiO_2,Al_2O_3$ or the like. The loadings of inorganic pigment and filler may be suitably set by taking into consideration, for example, the extent of the effects obtained by such incorporation and the substrate formability and other properties for the resin sheet forming process (e.g., extrusion, cast molding). Generally, it is preferable to set the loadings of the inorganic pigment and filler (when a plurality of types are included, the combined amount thereof) to from about 1% to about 20% by mass, and more preferably from about 2% to about 10% by mass (e.g., from about 3% to about 7% by mass) of the overall substrate. In the case of a multilayer substrate, it is preferable for at least one layer of the substrate to satisfy the above loadings, although all of the layers may do so.

Examples of antioxidants include those containing a phenol derivative (a hindered phenol); or a sulfur compound (an organic sulfur compound) as the active ingredient. Examples of light stabilizers include those containing a hindered amine as the active ingredient. Examples of ultraviolet absorbers include those containing benzophenone, a derivative thereof, or a benzotriazole as the active ingredient.

The substrate may be prepared by suitably employing an ordinary resin sheet (film) forming method known to the prior art. For example, using a molding material which contains the above resin component and optionally included additives and the like, film formation as a sheet may be carried out by a suitable process such as extrusion (e.g., a T-die process) or an inflation process. The method employed to manufacture a multilayer substrate is preferably a common multilayer coextrusion process.

The thickness of the substrate is not subject to any particular limitation, and may be suitably selected according to the intended application. Generally, it is suitable to use a substrate having a thickness of approximately not more than 300 μm (e.g., from about 10 μm to about 100 μm). In one preferred embodiment of the protective sheet disclosed herein, the substrate thickness is from about 25 μm to about 70 μm (e.g., from about 30 μm to about 60 μm). Protective sheets obtained using a substrate of this thickness are suitable as, for example, automotive paint film-protecting sheets. Preferred applications for the art disclosed herein include protective sheets in roll form obtained using a substrate having a width of at least 100 cm (e.g., from 100 cm to 250 cm). According to the conventional art which does not aim to hold the heat shrinkage at or below a specific level, the strain (and, in turn, the heat shrinkage ratio) of the substrate in a roll-type protective sheet having such a large width tends to be large, as a result of which adhesive transfer has a tendency to arise at the edges of the sheet. Therefore, the advantageous effects of applying the present invention can be achieved particularly well in such large-width roll-type protective sheets and methods of manufacture thereof.

Of the substrate 10 shown in FIG. 1, the surface 10a on the PSA layer side may be subjected to various types of surface treatment, such as acid treatment, corona discharge treatment, ultraviolet light irradiation treatment, plasma treatment, and primer application. If necessary, the back face 10b of the substrate 10 may be subjected to release treatment (e.g., treatment that involves applying a common silicone, long-chain alkyl, or fluorine-based release treatment agent in the form of a thin film having a thickness of typically from about 0.01 μm to about 1.0 μm). By implementing the release treatment, the paint film-protecting sheet 1 wound in roll form can be easily and effectively unwound.

The PSA layer provided in the protective sheet disclosed herein may be a PSA layer containing one, two or more PSAs selected from various known PSAs, including rubber, acrylic, polyester, urethane, polyether, silicone, polyamide, fluorine, poly(α-olefin) or ethylene-vinyl acetate copolymer-based PSAs. In one preferred mode, the PSA layer is a rubber-based PSA layer formed from a PSA composition in which the base polymer (the chief ingredient among the polymer ingredients) is a rubber-based polymer. Illustrative examples of such base polymers include natural rubber; styrene-butadiene rubber (SBR); polyisoprene; butyl rubbers such as regular butyl rubber, chlorinated butyl rubber and brominated butyl rubber; isobutylene polymers such as polyisobutylene, isoprene-isobutylene copolymers and modified forms thereof; and A-B-A type block copolymer rubbers and hydrogenates thereof, such as styrene-butadiene-styrene block copolymer rubbers (SBS), styrene-isoprene-styrene block copolymer rubbers (SIS), styrene-vinyl/isoprene-styrene block copolymer rubbers (SVIS), styrene-ethylene-butylene-styrene block copolymer rubbers (SEBS) which are hydrogenates of SBS, and styrene-ethylene-propylene-styrene block copolymer rubbers (SEPS) which are hydrogenates of SIS.

The art disclosed herein can be advantageously employed in roll-type protective sheets which have a PSA layer composed of a non-crosslinking PSA. Examples of the non-crosslinking PSA include the above-described PSAs which contain an A-B-A block copolymer rubber or a hydrogenate thereof as the base polymer and the above-described PSAs which contain an isobutylene based polymer as the base polymer. Of these, a PSA layer which is composed of a non-crosslinking PSA and was formed from a PSA composition containing an isobutylene polymer (polyisobutylene PSA) as the base polymer is preferred. Because the polyisobutylene PSA has a large solubility parameter (SP) difference with the paint film (e.g., automotive paint film), mass transfer does not easily arise between the two, and so attaching the protective sheet tends not to leave marks on the paint film. Also, the PSA layer has a high modulus of elasticity, which is desirable in a PSA for PSA sheets used in embodiments such as paint film-protecting sheets that are eventually removed; i.e., a removable PSA.

The above isobutylene polymer may be an isobutylene homopolymer (homoisobutylene) or a copolymer in which the main monomer is isobutylene. The copolymer may be, for example, a copolymer of isobutylene and n-butylene, a copolymer of isobutylene and isoprene (e.g., regular butyl rubber, chlorinated butyl rubber, brominated butyl rubber, partially crosslinked butyl rubber), or a vulcanized form or modified form (e.g., one modified with functional groups such as hydroxyl groups, carboxyl groups, amino groups, or epoxy groups) thereof. From the standpoint of adhesive strength stability (e.g., the quality where the adhesive strength does not rise excessively over time or due to the heat history), examples of isobutylene polymers preferred for use include homoisobutylene and isobutylene-n-butylene copolymers. Of these, homoisobutylene is preferred.

The molecular weight of such isobutylene-polymers is not subject to any particular limitation. For example, such polymers having a weight-average molecular weight (Mw) of from about $1 \times 10^4$ to $150 \times 10^4$ may be suitably selected and used. It is also possible to use in combination a plurality of isobutylene polymers of mutually differing weight-average molecular weights. The Mw of the isobutylene polymers used as a whole is preferably in a range of from about $10 \times 10^4$ to about $150 \times 10^4$, and more preferably from about $30 \times 10^4$ to about $100 \times 10^4$.

The above isobutylene polymer may be a peptized isobutylene polymer obtained by subjecting a higher molecular weight isobutylene polymer to peptizing treatment so as to lower the molecular weight (preferably to the above-indicated preferred weight-average molecular weight). Such peptizing treatment is preferably carried out so as to obtain an isobutylene polymer having a weight-average molecular weight Mw which is from about 10% to about 80% that prior to peptizing treatment. Alternatively, such treatment may be advantageously carried out so as to obtain an isobutylene polymer having a number-average molecular weight (Mn) of from about $10 \times 10^4$ to about $40 \times 10^4$. Such peptizing treatment may be performed based on the description provided in, for example, Japanese Patent No. 3878700.

The above polyisobutylene PSA may be composed of one, two or more base polymers selected from among such isobutylene polymers. In addition to this base polymer, the polyisobutylene PSA may contain as secondary ingredients polymers other than polyisobutylene polymers. Examples of such polymers other than polyisobutylene polymers include poly(meth)acrylic acid esters, polybutadiene, polystyrene, polyisoprene, polyurethane, polyacrylonitrile and polyamide. In general, it is preferable to set the content of such polymers other than polyisobutylene polymers to 10% by mass or less of the overall polymer ingredients included in the polyisobutylene-based PSA. A PSA containing substantially no polymer other than polyisobutylene polymer is also acceptable.

The PSA used in the protective sheet disclosed herein may contain, if necessary, suitable ingredients (additives) whose inclusion in such PSAs is acceptable. Examples of such additives include softeners, tackifiers and peeling aids. Additional examples include inorganic weathering stabilizers such as pigments and fillers; and organic weathering stabilizers such as light stabilizers (radical scavengers), ultraviolet absorbers and antioxidants. Each of these types of additives may be used singly or as a combination of two or more thereof. The loadings of additives included may be set to about the same as the ordinary loadings in the field of PSAs for paint film-protecting sheets (e.g., automotive paint film-protecting sheets).

Preferred examples of tackifiers that may be used include alkyl phenol resins, terpene phenol resins, epoxy resins, coumarone indene resins, rosin resins, terpene resins, alkyd resins, and hydrogenates thereof. When a tackifier is used, the loading thereof may be set to, for example, from approximately 0.1 to 50 parts by weight, per 100 parts by weight of the base polymer. Generally, it is preferable for the amount of tackifier included to be set to from 0.1 to 5 parts by weight per 100 parts by weight of the base polymer. Alternatively, the PSA may have a composition which is substantially free of tackifier.

Examples of softeners include low-molecular-weight rubber materials, process oils (typically paraffinic oils), petroleum-based softeners and epoxy compounds. Examples of pigments or fillers include inorganic powders such as titanium oxide, zinc oxide, calcium oxide, magnesium oxide and silica. Examples of peeling aids include silicone-based peeling aids, paraffinic peeling aids, polyethylene wax and acrylic polymers. When a peeling aid is used, the loading thereof may be set to, for example, from about 0.01 to about 5 parts by weight per 100 parts by weight of the base polymer. Alternatively, the PSA may have a composition which is substantially free of peeling aid. Light stabilizers, ultraviolet absorbers and antioxidants that may be used include the same as those in the substrate.

The thickness of the PSA layer is not subject to any particular limitation, and may be suitably set according to the intended application. Generally, a thickness of up to about 100 μm (e.g., from 2 μm to 100 μm) is appropriate, a thickness from about 3 μm to about 30 μm is preferred, and a thickness of from about 5 μm to about 20 μm is more preferred. For example, the above range may be preferably used as the PSA layer thickness in an automotive paint film-protecting sheet.

Formation of the PSA layer may be carried out in general accordance with known methods of forming PSA layers in PSA sheets. For example, preferred use may be made of a direct process wherein a PSA composition of a PSA layer-forming material containing the polymer ingredients and any additives to be optionally included which is dissolved or dispersed in a suitable solvent is furnished (e.g., prepared or purchased), and the composition is directly applied (typically coated) onto a substrate and dried to form the PSA layer. Alternatively, use may be made of a transfer process wherein the above PSA composition is applied onto a surface having good peelability (e.g., the surface of a peeling liner, or the release-treated back face of the substrate) and dried, thereby forming a PSA layer on the surface, following which the PSA layer is transferred to a substrate. This PSA layer is typically formed continuously although, depending on the intended object and use thereof, it may be formed in a regular (e.g., dotted or striped) pattern or in a random pattern.

Figure 2:
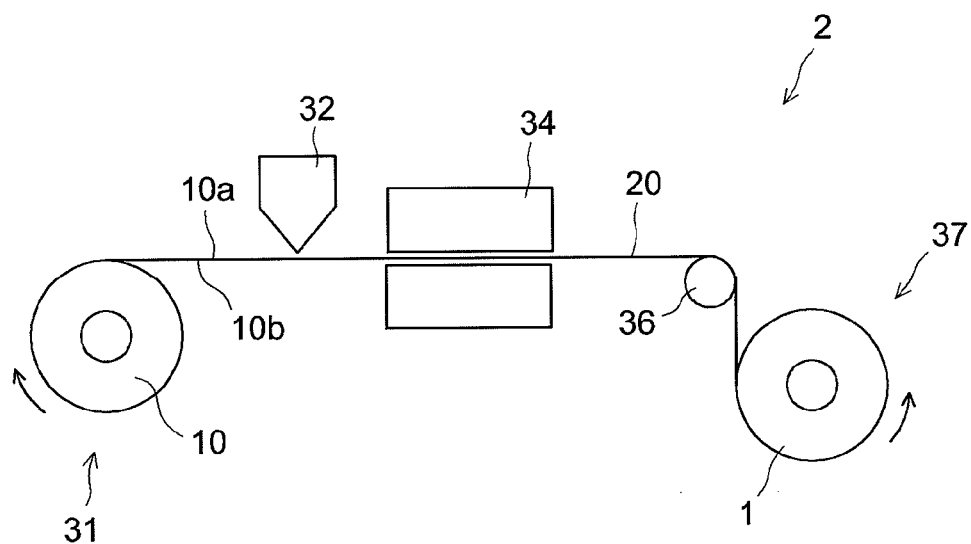
FIG. 2 is a schematic diagram showing an apparatus such as may be used to manufacture a roll-type paint film-protecting sheet according to the present invention.

A preferred mode for manufacturing a roll-type paint film-protecting sheet 1 according to the present invention is described in conjunction with the appended diagrams. Referring to FIG. 2, a paint film-protecting sheet manufacturing apparatus 2 has a substrate feeder 31 which lets out a substrate 10 that has been wound into a roll, a reel 37 which takes up into a roll a substrate that has been subjected to adhesive treatment (PSA sheet), and a coater 32 and a dryer 34 which are disposed therebetween in this order from the upstream side. This apparatus 2 is configured in such a way that, as the substrate 10 that has been unwound from the substrate feeder 31 travels to the reel 37, a PSA composition is applied to the surface 10a thereof by the coater 32 and then the substrate 10 is passed through the dryer 34, where the composition is dried so as to form a PSA layer 20.

In order to properly carry out the above travel and take-up (e.g., so that sagging and creasing do not arise in the substrate 10), the apparatus 2 is operated in such a way as to apply a suitable degree of tension to the substrate 10. In particular, when the PSA sheet obtained by subjecting the substrate 10 to adhesive treatment is taken up into a roll, it is important that this be done in such a way that defects such as creases and weaving do not arise. In order to prevent such defects from arising and reduce the heat shrinkage ratio, the winding tension of the PSA sheet is preferably set to not more than 100 N (about 10 kgf) per meter of sheet width. For example, it is preferable to adjust the operating conditions of the apparatus 2 such that the winding tension of the PSA sheet is from about 60 N to about 100 N. Although not subject to any particular limitation, the above winding tension may be adjusted by means of, for example, the balance between the unwinding speed of the substrate 10 at the substrate feeder 31 and the take-up speed of the PSA sheet at the reel 37. Detection of the winding tension may be carried out by utilizing, for example, the substrate feeder 31, the reel 37 or, at some point therebetween, a feed roller 36 over which the substrate 10 extends.

EXAMPLES

Several examples of the invention are described below, although these examples are not intended to limit the scope of the invention. In the description that follows, unless noted otherwise, all references to "parts" and "%" are based on the weight of non-volatiles.

Preparation of Paint Film-Protecting Sheet in Roll Form

Feedstocks formulated in the weight ratios shown in Table 1 below were melt mixed in a three-layer coextrusion T-die film extruder, then discharged as a film with respective layer thicknesses having the values shown in this table to produce a substrate with a total thickness of 40 μm. A propylene homopolymer (produced by Japan Polypropylene Corporation under the trade name Novatec PP FY4) was used here as the polypropylene resin. Linear low-density polyethylene (LLDPE) (produced by Nihon Polyethylene Corporation under the trade name Kernel KF 380) was used as the polyethylene resin. Rutile-type titanium dioxide coated with $SiO_2Al_2O_3$ (produced by Ishihara Sangyo Kaisha, Ltd. under the trade name TIPAQUE CR-95) was used as the $TiO_2$. The thicknesses of the respective layers making up the substrate in each example were confirmed by electron microscopic observation.

A PSA composition was prepared by dissolving 90 parts of a polyisobutylene produced by BASF under the trade name Oppanol B-80 and 10 parts of a polyisobutylene produced by BASF under the trade name Oppanol B-12SFN in an organic solvent. Using a paint film-protecting sheet manufacturing apparatus 2 of the configuration shown schematically in FIG. 2, the PSA composition was coated onto the inner layer surface (surface 10a) of the substrate 10 obtained as described above in the respective examples and dried, thereby forming a PSA layer 20 having a thickness of 10 μm. The resulting PSA sheet was taken up in the lengthwise direction, giving a paint film-protecting sheet 1 wound into a roll. The winding tension at this time was set as low as possible within a range that enables the formation of a roll free of creases and other defects. The specific winding tension settings used in the respective examples are also shown in Table 1.

Each of the roll-type paint film-protecting sheets obtained was subjected as described below to measurement of the heat shrinkage ratio and evaluation of the tendency for adhesive transfer. The results are shown collectively in Table 1.

Measurement of MD Heat Shrinkage Ratio

In each example, the paint film-protecting sheet was unwound from the roll form, and immediately cut into squares having a machine-direction (MD) length of 20 cm and a transverse direction (TD) length of 20 cm. The operation from unwinding to the completion of cutting was carried out within a space of 5 minutes. The resulting test pieces were held at 80° C. for one hour, then left to stand for one hour in a standard environment (under conditions of 23±2° C. and 50±15% relative humidity), following which the MD length of the sample was measured using a digital caliper. The MD heat shrinkage ratio of each sample was computed from this measured value.

Evaluation of Tendency for Adhesive Transfer

To deliberately create a surface state where adhesive transfer readily arises, the surface of a paint film obtained by painting a 45 cm×30 cm steel plate with an alkyd-melamine paint (Kansai Paint Co., Ltd.; trade name: Amilac TM-13 (RC)) was subjected to 5 minutes of polishing treatment at 1500 rpm using an abrasive (Sumitomo 3M Ltd.; trade name: Hard 5982-1-L) with an electric polisher (Makita Corporation; model No. PV7001C) to which was attached a wool buff pad (Hitachi Koki Co., Ltd.; trade name: 959-721). Next, the abrasive on the surface was removed from the test piece with a flannel polishing cloth, thereby giving the adherend. The above operations were carried out in a standard environment adjusted to a temperature of 23±2° C. and 50±15% relative humidity.

Adhesive Transfer at Sheet Edges: In each example, the paint film-protecting sheet was unwound from the roll form, and immediately cut into rectangles having a MD length of 50 mm and a TD length of 70 mm. The rectangular pieces were folded at the center to form a crease, and attached to the above adherend. The operation from unwinding to attachment to the adherend was carried out within a space of 5 minutes. The adherend to which the above test piece had been attached was stored at 80° C. for four days, following which, under 80° C. conditions, the test piece was removed by hand from the adherend at a peel angle of 90° and a peel rate of about 100 mm/min. After peeling, the surface of the adherend (at places corresponding to the sheet edges) was visually examined, and both the presence/absence and the degree of adhesive transfer were rated.

Adhesive Transfer in Areas Protected by Sheet: Test piece production, bonding, storage and peeling were carried out in the same way as described above for evaluating adhesive transfer at the sheet edges. In addition to adhesive transfer at an elevated temperature (80° C.) at which cohesive failure readily arises, testing was carried out also on adhesive transfer under low-temperature conditions at which anchoring failure readily arises. That is, an adherend having a test piece produced and attached thereto in the same way as described above was stored at 23° C. for four days, following which, under 0° C. conditions, the test piece was removed by hand from the adherend at a peel angle of 90° and a peel rate of about 100 mm/min. After peeling, the surface of the adherend (at places corresponding to the areas protected by the sheet) was visually examined, and both the presence/absence and the degree of adhesive transfer were comprehensively rated from the high-temperature and low-temperature test results.

Adhesive transfer at the edges of the sheet and in the areas protected by the sheet was rated according to the following criteria.

4: No adhesive transfer whatsoever (good ability to prevent adhesive transfer).

3: Slight adhesive transfer is observable, but of a degree acceptable for practical purposes (good ability to prevent adhesive transfer).

2: Distinct adhesive transfer is observable (poor ability to prevent adhesive transfer).

1: Considerable adhesive transfer (poor ability to prevent adhesive transfer).

TABLE 1

| | | EX 1 | EX 2 | EX 3 | EX 4 | EX 5 | EX 6 | EX 7 | EX 8 | EX 9 | EX 10 | EX 11 |
|---|---|---|---|---|---|---|---|---|---|---|---|---|
| Formulation (weight ratio) PP/PE/TiO$_2$ | Outer layer (10 μm) | 65/30/5 | 55/40/5 | 65/30/5 | 65/30/5 | 75/20/5 | 85/10/5 | 85/10 5 | 55/40/5 | 35/60/5 | 65/30/5 | 65/30/5 |
| | Middle layer (20 μm) | 25/75/5 | 55/40/5 | 85/10/5 | 55/40/5 | | 85/10/5 | | 10/85/5 | | 55/40/5 | 55/40/5 |
| | Inner layer (10 μm) | 75/20/5 | 75/20/5 | 65/30/5 | 65/30/5 | | 45/50/5 | | 85/10/5 | | 65/30/5 | 65/30/5 |
| % ethylene in overall substrate (EC2) | | 50% | 35% | 20% | 35% | 20% | 20% | 10% | 55% | 60% | 35% | 35% |
| % ethylene in inner layer (EC1) | | 20% | 20% | 30% | 30% | 20% | 50% | 10% | 10% | 60% | 30% | 35% |
| MD heat shrinkage ratio | | 1.0% | 0.8% | 0.9% | 0.9% | 1.0% | 0.8% | 0.9% | 1.6% | 2.0% | 1.20% | 1.40% |
| Winding tension (N/m) | | 80 | 80 | 80 | 80 | 80 | 80 | 100 | 100 | 80 | 100 | 150 |
| Adhesive transfer in areas protected by sheet | | good | good | good | good | good | good | poor | poor | good | good | good |
| (rating) | | (3) | (3) | (4) | (4) | (3) | (4) | (2) | (2) | (4) | (4) | (4) |
| Adhesive transfer at sheet edges | | good | good | good | good | good | good | good | poor | poor | good | poor |
| (rating) | | (4) | (4) | (4) | (4) | (4) | (4) | (4) | (1) | (1) | (4) | (2) |

As shown in Table 1, the protective sheets in Examples 1 to 7 and Example 10 which had MD heat shrinkage ratios of 1.2% or less (specifically, from 0.8 to 1.2%) all had a good ability to prevent adhesive transfer at the edges. Of these, the protective sheets in Examples 1 to 6 and Example 10 which were obtained using a substrate wherein the ethylene component content (EC1) at the surface on the PSA layer side was 15% or more (more specifically, from 20 to 50%), even though no particular use was made of a primer, exhibited a satisfactory ability to prevent adhesive transfer, not only at the edges, but also in areas protected by the sheet.

On the other hand, in the protective sheets in Examples 8, 9 and Example 11, which had MD heat shrinkage ratios that were too large, adhesive transfer was clearly observed at the edges. Also, in the protective sheets in Examples 8 and 9, within a range in the winding tension per meter of sheet width of up to 100 N, it was quite difficult to carry out take-up so as to form a roll free of creases and other defects. This result supports the observation that, at an ethylene component content (EC2) in the overall substrate greater than 50%, a roll-type protective sheet in which the MD heat shrinkage ratio has been held to 1.2% or less is difficult to obtain. Also, adhesive transfer was observed in the areas protected by the protective sheets in both Examples 7 and 8 in which EC1 was less than 15%.

The embodiments thus disclosed in detail according to the present invention are to be considered in all respects as illustrative and not limiting. The scope of the invention is indicated by the appended claims rather than by the foregoing description, and all changes which come within the meaning and range of equivalency of the claims are intended to be embraced therein.

The paint film-protecting sheet of the invention may be advantageously used in applications where it is affixed to the paint film on articles to be protected (examples of which include articles having a paint film formed by the abovementioned painting treatment, such as an automotive bodies and automotive components, or sheet metal such as sheet steel and shaped articles thereof) which have been painted with paints of various compositions, such as polyester, alkyd, melamine or urethane-based paints or paints based on combinations thereof, so as to protect the paint film from the impact of very small bodies or contact with chemicals. Such sheets are especially suitable as protective sheets for automobiles (e.g., for the outer paint film on automotive bodies), which have a high likelihood of being stored outdoors for extended periods of time or of being transported to tropical regions or regions of various other climates and which are subject to high requirements concerning the appearance and decorativeness of the paint film.

What is claimed is:

1. A paint film-protecting sheet in roll form comprising a pressure-sensitive adhesive sheet wound in a lengthwise direction with the adhesive sheet comprising a substrate in continuous sheet form and a pressure-sensitive adhesive layer disposed on the substrate, wherein
the substrate is an extruded sheet is a multilayer substrate consisting of two, three, or four layers and each layer of the substrate contains a polyethylene and a polypropylene resin in a different blend ratio compared to the other layer of the multilayer substrate,
a surface of the layer directly on a pressure-sensitive adhesive layer side thereof is composed of a material containing at least 20% by mass of an ethylene component,
the pressure-sensitive adhesive layer is formed of a non-crosslinking polyisobutylene-based pressure-sensitive adhesive, and
the paint film-protecting sheet, after being unwound from the roll, has a percent shrinkage, in the lengthwise direction, of 1.2% or less than 1.2% when heated at 80° C. for 1 hour.

2. The protective sheet according to claim 1, wherein the substrate comprises polypropylene as the primary resin component, and wherein the substrate contains an ethylene component in an amount of not greater than 50% by mass of the substrate.

3. The protective sheet according to claim 1, wherein the substrate comprises isotactic polypropylene.

4. The protective sheet according to claim 1, wherein the substrate comprises a random polypropylene obtained by random copolymerization of 96 to 99.9 mol % of propylene and 0.1 to 4 mol % of ethylene and/or butene.

5. The protective sheet according to claim 1, wherein the substrate comprises a polymer obtained by copolymerizing 90 to 99.9 mol % of propylene with 0.1 to 10 mol % of ethylene and/or butene; and as a byproduct a rubber component composed of propylene and ethylene and/or butene.

6. The protective sheet according to claim 1, wherein the substrate comprises (a) a thermoplastic olefin resin and/or thermoplastic elastomer of a reactor blend obtained by copolymerizing a rubber ingredient in a propylene polymer and/or (b) a thermoplastic olefin resin and/or thermoplastic elastomer of a dry blend obtained by mechanically dispersing a rubber ingredient in a propylene polymer.

7. The protective sheet according to claim 1, wherein the substrate comprises the polypropylene resin containing a copolymer of propylene and a functional group-containing monomer having both a polymerizable functional group and another functional group.

8. The protective sheet according to claim 1, wherein the substrate comprises the polyethylene resin obtained by copolymerizing 50% by mass or more of ethylene with at least one α-olefin selected from propylene, 1-butene, 1-hexene, 4-methyl-1-pentene, and 1-octene.

9. The protective sheet according to claim 1, wherein the substrate comprises the polyethylene resin containing a copolymer of ethylene and a functional group-containing monomer having both a polymerizable functional group and another functional group.

10. The protective sheet according to claim 1, wherein the substrate comprises at least one copolymer selected from an ethylene-vinyl acetate copolymer, an ethylene-acrylic acid copolymer, an ethylene-methacrylic acid copolymer, an ethylene-methyl acrylate copolymer, an ethylene-ethyl acrylate copolymer, an ethylene-methyl methacrylate copolymer, and an ethylene (meth)acrylic acid copolymer having been crosslinked with a metallic ion.

11. The protective sheet according to claim 1, wherein the substrate comprises the polyethylene resin having a density of 0.9 to 0.94 $g/cm^3$.

12. The protective sheet according to claim 1, wherein the substrate comprises a low density polyethylene and/or a linear low density polyethylene.

13. The protective sheet according to claim 1, wherein the polypropylene or polyethylene resin material making up the substrate has a melt mass flow rate of 0.5 to 10 g/10 min.

14. The protective sheet according to claim 1, wherein the substrate has the multilayer structure, and at least a material forming an inner layer situated furthest on the pressure-sensitive adhesive layer side is a material containing at least 20% by mass of an ethylene component.

15. The protective sheet according to claim 1, wherein the substrate comprises titanium oxide.

16. The protective sheet according to claim 1, wherein the substrate comprises a titanium oxide comprising a titanium oxide particle and $SiO_2Al_2O_3$ with which a surface of the titanium oxide particle is coated.

17. A paint film-protecting sheet in roll form comprising a pressure-sensitive adhesive sheet wound in a lengthwise direction with the adhesive sheet consisting essentially of a substrate in continuous sheet form and a pressure-sensitive adhesive layer disposed on the substrate,
wherein
the substrate consists only of an extruded sheet is a multilayer substrate consisting of two, three, or four layers and each layer of the substrate contains a polyethylene and a polypropylene resin in a different blend ratio compared to the other layer of the multilayer substrate,
a surface of the layer directly on a pressure-sensitive adhesive layer side thereof is composed of a material containing at least 20% by mass of an ethylene component the pressure-sensitive adhesive layer is formed of a non-crosslinking polyisobutylene-based pressure-sensitive adhesive, and the paint film-protecting sheet, after being unwound from the roll, has a percent shrinkage, in the lengthwise direction, of 1.2% or less than 1.2% when heated at 80° C. for 1 hour.

* * * * *